(12) United States Patent
Berne et al.

(10) Patent No.: US 12,420,709 B2
(45) Date of Patent: Sep. 23, 2025

(54) METHOD FOR AUTOMATICALLY ADAPTING A VIEW ANGLE OF A REAR VISION SYSTEM

(71) Applicant: Volvo Truck Corporation, Gothenburg (SE)

(72) Inventors: Nicolas Berne, Heyrieux (FR); MinJuan Wang, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 394 days.

(21) Appl. No.: 18/115,866

(22) Filed: Mar. 1, 2023

(65) Prior Publication Data
US 2023/0278494 A1   Sep. 7, 2023

(30) Foreign Application Priority Data

Mar. 3, 2022   (EP) ..................................... 22159879

(51) Int. Cl.
*B60R 1/06* (2006.01)
*B60R 1/12* (2006.01)

(52) U.S. Cl.
CPC .................. *B60R 1/06* (2013.01); *B60R 1/12* (2013.01); *B60R 2001/1215* (2013.01); *B60R 2001/1253* (2013.01); *B60R 2300/302* (2013.01); *B60R 2300/70* (2013.01)

(58) Field of Classification Search
CPC .... B60R 1/00; B60R 1/02; B60R 1/04; B60R 1/06; B60R 1/12; B60R 1/28; B60R 2300/302; B60R 2300/70; B60Q 2001/1215; B60Q 2001/1253
See application file for complete search history.

(56) References Cited

U.S. PATENT DOCUMENTS

| | | |
|---|---|---|
| 2010/0182432 A1 | 7/2010 | Augst |
| 2010/0225762 A1 | 9/2010 | Augst |

FOREIGN PATENT DOCUMENTS

| | | | | |
|---|---|---|---|---|
| WO | WO-2016173763 A1 | * | 11/2016 | ............... B60R 1/00 |
| WO | WO-2020115929 A1 | * | 6/2020 | |

OTHER PUBLICATIONS

Communication pursuant to Article 94(3) EPC for European Patent Application No. 22159879.0 mailed Oct. 18, 2024, 4 pages.
European Search Report, EP Application No. 22159879, mailed Jun. 30, 2022, 3 pages.

* cited by examiner

*Primary Examiner* — Laura A Gudorf
(74) *Attorney, Agent, or Firm* — Sage Patent Group

(57) ABSTRACT

A method for automatically adapting a view angle of a displayed image on a side screen of a rear vision system of a vehicle, said rear vision system having a side camera adapted to generate said displayed image according to a varying view angle between a minimal and maximal value, the method comprising following steps: obtaining instant GPS location data; obtaining a map; determining the location of the vehicle on the map at each determined interval; adapting the view angle of the displayed image in function of the location of the vehicle on the map, the view angle being set on a default value outside the merging portions and the view angle being varied according to a widening pattern along a merging portion.

13 Claims, 1 Drawing Sheet

METHOD FOR AUTOMATICALLY ADAPTING A VIEW ANGLE OF A REAR VISION SYSTEM

CROSS REFERENCE TO RELATED APPLICATIONS

This application claims priority to European Application No. 22159879.0 filed on Mar. 3, 2022, the disclosure and content of which is incorporated by reference herein in its entirety.

TECHNICAL FIELD

The present disclosure relates to the field of camera or imaging management system on vehicles, in particular to a method to automatically adapt a view angle of a displayed image on an inner side screen of a rear vision system of a vehicle.

BACKGROUND

It is known to replace the rear-view mirrors of a vehicle by a rear vision system. For each side of the vehicle, the rear vision system comprises a side camera and a side screen for displaying the rear side view.

The rear vision system has many advantages compared to the rear-view mirror. For example, this is possible to zoom in and out to obtain a general view or a detail view of the rear side.

There is however a need to display at certain times rear side portions that are outside a default view angle displayed on the screen. For example, there is no need of a wide angle while driving a one way or two-way street whereas it can become advantageous while driving in an insertion lane of a highway.

It can be difficult for the driver to adapt by hand instantly the zoom and/or focus region of the side camera.

The present disclosure aims to solve all or some of the disadvantages mentioned above.

SUMMARY

To that end, the present disclosure provides a method for automatically adapting a view angle of a displayed image on a side screen of a rear vision system of a vehicle, said rear vision system having a side camera adapted to generate said displayed image according to a varying view angle between a minimal and maximal value, the method comprising following steps:
  obtaining instant GPS location data of the vehicle on a determined interval basis;
  obtaining a map of a defined area around the obtained instant GPS location of the vehicle at each determined interval, the map including circulation lanes and merging portions from secondary lanes to main lanes provided with insertion lanes;
  determining the location of the vehicle on the map at each determined interval; and
  adapting the view angle of the displayed image in function of the location of the vehicle on the map, the view angle being set on a default value outside the merging portions and the view angle being varied according to a widening pattern along a merging portion.

This provision enables automatically widening the view angle of the side screen to enable the driver to look at the main lane while still being in the merging portion.

Indeed, absent a widened rear side view, the driver would need to turn his head to look behind him or her for safe insertion on the main lane.

The main lane is to be understood as the circulation lane that has priority on the secondary lane for the vehicle circulation. Thus, the vehicle on the merging portion has to assure that there are no other vehicles behind it before changing lane.

In the present text, the term image is to be understood as real time footage so that the side screen replaces a side rear-view mirror.

The instant GPS location data can be measured by the vehicle when network is available or estimated by the vehicle when network is not available.

According to an aspect, merging portions of the map are determined by recognizing crossroads that present a secondary lane tangential to the main lane or vice versa.

Alternatively, or additionally, merging portions of the map can be determined by recognizing crossroads wherein an incident angle between the main lane and the secondary lane is inferior to a determined value.

This enables widening the view angle not only for insertion lanes but also for crossroads that present quasi-tangential configuration. As an example, the determined value is less than 45° and in particular less than 10°.

According to an aspect, recognized merging portions of the map are tagged on the map, merging portions tagging being used to calculate the view angle.

In particular, tagging can be realized in advance and incorporated on the map data. It can be subject of updates.

According to an aspect, the step of adapting the view angle is realized when the insertion lanes imply a lane change or merge towards a side corresponding to the side screen from the vehicle point of view.

Thus, when the driver is for example in a merging portion implying that he moves over on the left from a secondary lane to a main lane, the left side screen is adapting his view angle.

The driver is then able to see if there is another vehicle behind the vehicle on the lane he has to move over to. A wider view angle enables him to see behind on the left side well before the intersection, in particular when the vehicle of the driver is on an angled trajectory with respect to the main lane due to the configuration of the secondary lane.

It therefore appears advantageous to have an automatic widening when the insertion lane is a curve that tangentially merge with the main lane.

According to an aspect, the merging portions are defined as curves on the map and widening patterns are determined taking into account a direction deviation of the curve at the vehicle location with the main lane direction and/or taking into account the percentage of the curve realized by the vehicle.

In other words, at the vehicle location on the curve, the direction deviation corresponds to the incident angle between a tangent of the curve and the main lane direction. The widening pattern is also adapted if the vehicle is at the beginning, the middle or the end of the merging portion.

The view angle depends on the direction deviation of the curve at the vehicle location.

The direction deviation of the curve at the vehicle location is used as an input to calculate the view angle. In particular, when the direction deviation is high, the view angle is large. The principle is to extend the view angle from a default value corresponding as a default setting of the view angle when the vehicle is outside the merging portions.

The extension of the view angle is calculated starting from the instant direction deviation at the vehicle location. A calibration can be realized to determine beforehand the extension of the view angle depending on the vehicle.

Alternatively, a pre-set value can be used to define the relationship between the view angle extension and the direction deviation. In addition, said relationship can be adjusted by the driver.

According to an aspect, the direction deviation variation is tagged on the obtained map along the curve.

This facilitates the determination of the widening pattern as the evolution of the incident angle is known along the curve. In particular, a plurality of incident angles values can be tagged along the curve.

Alternatively, a curve trajectory recognition model having as output an evolution of the incident angle can be used.

According to an aspect, the widening pattern correspond to progressive increase and decrease of the view angle displayed on the side screen.

This provision facilitates the adaptation of the driver because there is no fast scale change. It enables to smoothen the change from the default view angle to an enlarged angle and back to the default view angle.

According to an aspect, the adaptation of the view angle corresponds to a change of focal length of the side camera or a reframing of a cropped section of a captured image.

Variable focal length camera can be used to zoom out and in for the adaptation of the view angle. Alternatively, fixed focal length camera can be used, for example wide angle camera that can engender cropped displayed images on the side screen.

According to an aspect, a vehicle alignment direction tangentially to the secondary lane and/or the steering angle are taken into account to determine the widening pattern.

This means that, in addition to the topography of the merging portion with respect to the main lane, the movements of the vehicle are taken into account at each interval to define the widening pattern.

According to an aspect, the vehicle is a truck including a cab and a trailer, the vehicle alignment direction being based on the cab orientation and being independent from a cab-trailer angle.

If the cab slightly diverts from the trajectory of the merging portion, the widening pattern is adapted.

In particular, if the deviation corresponds to an increase of the incident angle between the main lane and the secondary lane, the view angle is increased correspondingly and vice versa.

According to an aspect, each merging portion includes and end part of the secondary lane and a contiguous part of the main lane.

It can include an end part extending according to the main lane direction. This way the driver continues to have a global view just after arriving on the main lane.

According to an aspect, the rear vision system comprises a command system configured to exchange data with a remote server thanks to a wireless connection device of the vehicle, the command system being configured to receive GPS location data from a vehicle geolocation device and elaborate a request for obtaining a map from the server.

This enables to have an update and accurate version of the map. Alternatively, or in addition, a memory of the command system can include map data. In this case, the command system can be configured to elaborate the map using said memorized map data.

The data exchange is realized via an internet and/or phone network connection device of the vehicle.

According to an aspect, the tagging of the map to define the location of the merging portions and/or the evolution of the incident angles along the merging portions is realized by the server.

In particular, the merging portions are recognized by the server and the tagging is incorporated on the map received by the vehicle from the server.

According to an aspect, the rear vision system is provided with left and right side cameras and corresponding side screens to operate in left and right insertion lanes.

The present disclosure also relates to a rear vision system adapted to realize the steps of the method previously described.

Further advantages and advantageous features are disclosed in the following description and in the dependent claims.

BRIEF DESCRIPTION OF THE DRAWINGS

With reference to the appended drawings, below follows a more detailed description of embodiments cited as examples.

In the drawings.

DETAILED DESCRIPTION

Figure 1:
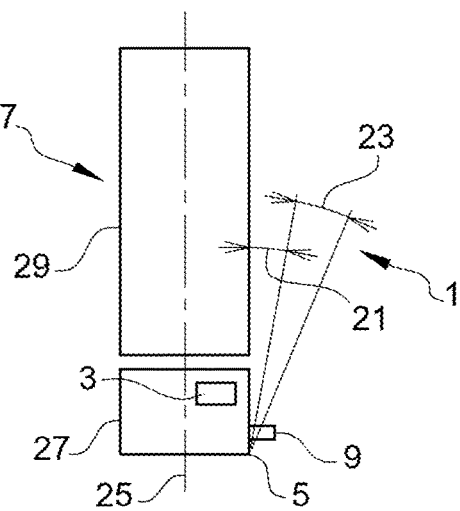
FIG. 1 is a schematic top view of a vehicle showing a default rear view angle and an extended rear view angle.
Figure 2:
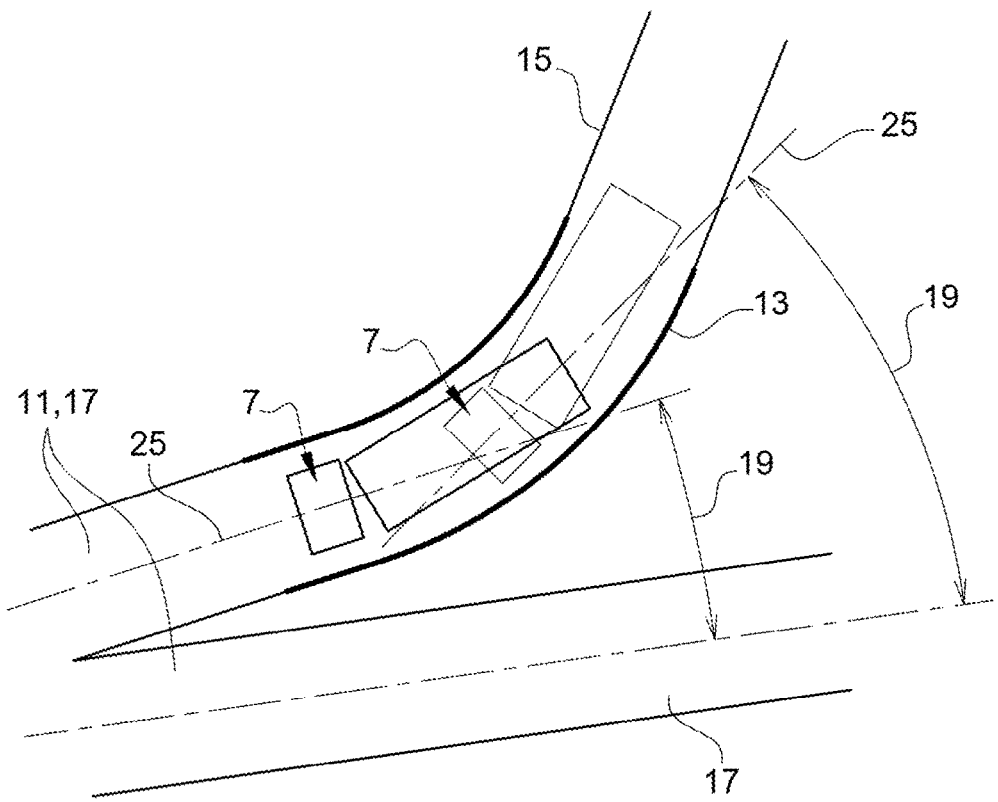
FIG. 2 is a schematic top view of a vehicle according to two successive positions on a merging lane.
Figure 3:
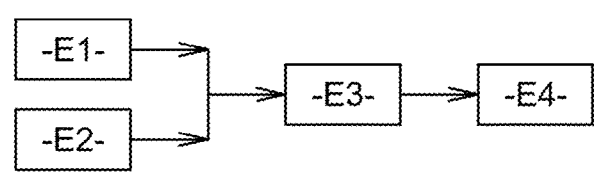
FIG. 3 is a diagram illustrating the steps of the described method.

As shown on FIGS. 1 to 3, a method for automatically adapting a view angle 1 of a displayed image on a side screen 3 of a rear vision system 5 of a vehicle 7 is disclosed.

Said rear vision system 5 has a side camera 9 adapted to generate said displayed image according to a varying view angle 1 between a minimal and maximal value.

The method comprises a step E1 consisting in obtaining instant GPS location data of the vehicle 7 on a determined interval basis.

The instant GPS location data can be measured by the vehicle 7 when network is available or estimated by the vehicle when network is not available.

The method comprises a step E2 consisting in obtaining a map of a defined area around the obtained instant GPS location of the vehicle 7 at each determined interval, the map including circulation lanes 11 and merging portions 13 from secondary lanes 15 to main lanes 17 provided with insertion lanes.

The main lane 17 is to be understood as the circulation lane that has priority on the secondary lane 15 for the vehicle 7 circulation. Thus, the vehicle 7 on the merging portion 13 has to assure that there are no other vehicles 7 behind it before changing lane.

In the present text, the term image is to be understood as real time footage so that the side screen 3 replaces a side rear-view mirror.

Merging portions 13 of the map are determined by recognizing crossroads that present a secondary lane 15 tangential to the main lane 17 or vice versa.

Alternatively, or additionally, merging portions 13 of the map can be determined by recognizing crossroads wherein an incident angle 19 between the main lane 17 and the secondary lane 15 is inferior to a determined value.

This enables to widen the view angle 1 not only for insertion lanes but also for crossroads that present quasi-tangential configuration. As an example, the determined value is less than 45 and in particular less than 10.

Recognized merging portions 13 of the map are tagged on the map, merging portions 13 tagging being used to calculate the view angle 1.

In particular, tagging can be realized in advance and incorporated on the map data. It can be subject of updates.

Each merging portion 13 includes and end part of the secondary lane 15 and a contiguous part of the main lane 17.

It can include an end part extending according to the main lane 17 direction. This way the driver continues to have a global view just after arriving on the main lane.

The method comprises a step E3 consisting in determining the location of the vehicle 7 on the map at each determined interval.

The method comprises a step E4 consisting in adapting the view angle 1 of the displayed image in function of the location of the vehicle 7 on the map, the view angle 1 being set on a default value 21 outside the merging portions 13 and the view angle 1 being varied according to a widening pattern 23 along a merging portion 13.

The step E4 of adapting the view angle 1 is realized when the insertion lanes imply a lane change or merge towards a side corresponding to the side screen from the vehicle 7 point of view.

Thus, when the driver is for example in a merging portion 13 implying that he moves over on the left from a secondary lane to a main lane 17, the left side screen 3 is adapting his view angle 1.

The driver is then able to see if there is another vehicle 7 behind it on the lane he has to move over to. A wider view angle 1 enables him to see behind on the left side well before the intersection, in particular when the vehicle 7 of the driver is on an angled trajectory with respect to the main lane 17 due to the configuration of the secondary lane 15.

There is thus an automatic widening when the insertion lane is a curve that tangentially merge with the main lane.

The merging portions 13 are defined as curves on the map and widening patterns 23 are determined taking into account a direction deviation of the curve at the vehicle 7 location with the main lane 17 direction and/or taking into account the percentage of the curve realized by the vehicle 7.

In other words, at the vehicle 7 location on the curve, the direction deviation corresponds to the incident angle 19 between a tangent of the curve and the main lane 17 direction. The widening pattern 23 is also adapted if the vehicle 7 is at the beginning, the middle or the end of the merging portion 13.

The view angle 1 depends on the direction deviation of the curve at the vehicle 7 location.

The direction deviation of the curve at the vehicle 7 location is used as an input to calculate the view angle 1. In particular, when the direction deviation is high, the view angle 1 is large. The principle is to extend the view angle 1 from a default value 21 corresponding as a default setting of the view angle 1 when the vehicle 7 is outside the merging portions 13.

The extension of the view angle 1 is calculated starting from the instant direction deviation at the vehicle 7 location. A calibration can be realized to determine beforehand the extension of the view angle 1 depending on the vehicle7.

Alternatively, a pre-set value can be used to define the relationship between the view angle 1 extension and the direction deviation. In addition, said relationship can be adjusted by the driver.

The direction deviation variation is tagged on the obtained map along the curve.

This facilitates the determination of the widening pattern 23 as the evolution of the incident angle 19 is known along the curve. In particular, a plurality of incident angles 19 values can be tagged along the curve.

Alternatively, a curve trajectory recognition model having as output an evolution of the incident angle 19 can be used.

The widening pattern 23 correspond to progressive increase and decrease of the view angle 1 displayed on the side screen 3.

There is no fast scale change. It enables to smoothen the change from the default view angle 1 to an enlarged angle and back to the default view angle 1.

The adaptation of the view angle 1 corresponds to a change of focal length of the side camera 9 or a reframing of a cropped section of a captured image.

Variable focal length camera can be used to zoom out and in for the adaptation of the view angle 1. Alternatively, fixed focal length camera can be used, for example wide angle camera that can engender cropped displayed images on the side screen 3.

A vehicle 7 alignment direction 25 tangentially to the secondary lane 15 and/or the steering angle are taken into account to determine the widening pattern 23.

This means that, in addition to the topography of the merging portion 13 with respect to the main lane 17, the movements of the vehicle 7 are taken into account at each interval to define the widening pattern 23.

As shown on FIGS. 1 and 2, the vehicle 1 is a truck including a cab 27 and a trailer 29, the vehicle 7 alignment direction 25 being based on the cab 27 orientation and being independent from a cab-trailer angle.

If the cab 27 slightly diverts from the trajectory of the merging portion 13, the widening pattern 23 is adapted.

In particular, if the deviation corresponds to an increase of the incident angle 19 between the main lane 17 and the secondary lane 15, the view angle 1 is increased correspondingly and vice versa.

Focusing on the structural arrangement, the rear vision system 5 comprises a command system configured to exchange data with a remote server thanks to a wireless connection device of the vehicle 7, the command system being configured to receive GPS location data from a vehicle geolocation device and elaborate a request for obtaining a map from the server.

This enables to have an update and accurate version of the map. Alternatively, or in addition, a memory of the command system can include map data. In this case, the command system can be configured to elaborate the map using said memorized map data.

The data exchange is realized via an internet and/or phone network connection device of the vehicle 1.

The tagging of the map to define the location of the merging portions and/or the evolution of the incident angles 19 along the merging portions 13 is realized by the server.

In particular, the merging portions 13 are recognized by the server and the tagging is incorporated on the map received by the vehicle 7 from the server.

The rear vision system 5 is provided with left and right side cameras and corresponding side screens 3 to operate in left and right insertion lanes.

It appears that the present method enables to automatically widen the view angle 1 of the side screen 3 to enable the driver to look at the main lane 17 while still being in the merging portion 13. Safety and user comfort is then improved.

It is to be understood that the present disclosure is not limited to the embodiments described above and illustrated in the drawings; rather, the skilled person will recognize that many changes and modifications may be made within the scope of the appended claims.

The invention claimed is:

1. A method for automatically adapting a view angle of a displayed image on a side screen of a rear vision system of a vehicle, said rear vision system having a side camera adapted to generate said displayed image according to a varying view angle between a minimal and maximal value, the method comprising:
   obtaining instant Global Positioning System (GPS) location data of the vehicle on a determined interval basis;
   obtaining a map of a defined area around the obtained instant GPS location of the vehicle at each determined interval, the map including circulation lanes and merging portions from secondary lanes tangential to main lanes provided with insertion lanes;
   determining the location of the vehicle on the map at each determined interval; and
   adapting the view angle of the displayed image in function of a location of the vehicle on the map, the view angle being set on a default value when the vehicle is outside the merging portions, and the view angle being progressively varied according to a widening pattern taking into account a direction deviation of a merging portion at the vehicle location with a main lane direction, when the vehicle is along one of the merging portions.

2. The method according to claim 1, wherein merging portions of the map are determined by recognizing crossroads that present a secondary lane tangential to the main lane or vice versa.

3. The method according to claim 2, wherein recognized merging portions of the map are tagged on the map, merging portions tagging being used to calculate the view angle.

4. The method according to claim 1, wherein the adaption of the view angle is realized when the insertion lanes imply a lane change or merge towards a side corresponding to the side screen from a point of view of the vehicle.

5. The method according to claim 1, wherein the merging portions are defined as curves on the map and widening patterns are determined taking into account a direction deviation of a curve at the vehicle location with the main lane direction and/or taking into account a percentage of the curve realized by the vehicle.

6. The method according to claim 5, wherein the direction deviation variation is tagged on the obtained map along the curve.

7. The method according to claim 1, wherein the widening pattern correspond to progressive increase and decrease of the view angle displayed on the side screen.

8. The method according to claim 1, wherein the adaptation of the view angle corresponds to a change of focal length of the side camera or a reframing of a cropped section of a captured image.

9. The method according to claim 1, wherein a vehicle alignment direction tangentially to the secondary lane and/or a steering angle are taken into account to determine the widening pattern.

10. The method according to claim 9, wherein the vehicle is a truck including a cab and a trailer, the vehicle alignment direction being based on a cab orientation and being independent from a cab-trailer angle.

11. The method according to claim 1, wherein each merging portion includes an end part of the secondary lane and a contiguous part of the main lane.

12. The method according to claim 1, wherein the rear vision system comprises a command system configured to exchange data with a remote server thanks to a wireless connection device of the vehicle, the command system being configured to receive GPS location data from a vehicle geolocation device and elaborate a request for obtaining a map from the server.

13. The method according to claim 1, wherein the rear vision system is provided with left and right side cameras and corresponding side screens to operate in left and right insertion lanes.

* * * * *